Patented Mar. 11, 1952

2,588,947

UNITED STATES PATENT OFFICE 2,588,947

DELAYED-ACTION COAGULANT AND METHOD OF COAGULATING ACID-COAGULABLE LATEX

Jerome C. Westfahl, Cuyahoga Falls, Ohio, assignor to The B. F. Goodrich Company, New York, N. Y., a corporation of New York No Drawing. Application April 2, 1947,
Serial No. 738,944

21 Claims. (Cl. 260—821)

1

This invention relates to the coagulation of a latex and is particularly concerned with delayed coagulation of an aqueous dispersion of natural or synthetic rubber by the admixture with said dispersion of a delayed action coagulant composition.

Latex is ordinarily coagulated by an instantaneous coagulant such as water-soluble acid or a water-soluble polyvalent metal salt. In many instances, however, it is desirable to disperse the coagulant for the latex in the latex dispersion without effecting immediate coagulation. For this purpose, a so-called delayed action coagulant is necessary which undergoes a measurable induction period before effecting coagulation. This delayed action coagulation is particularly desirable in the manufacture of "foamed" sponge rubber articles wherein the rubber latex is brought into a semi-stable foamed condition by whipping air into the latex or by incorporating a gas-forming material therein. This semi-stable foam is then coagulated, before the foam collapses, to give a cellular product. Instantaneous coagulants obviously cannot be incorporated into the latex before foaming; and if sprayed on the semi-stable foam, they must effect coagulation by slow diffusion through the foam which does not yield a uniform product.

It is desirable, therefore, to provide a coagulant composition which can be completely mixed with a latex without effecting coagulation of the latex and which thereafter completely coagulates the latex after the lapse of a measurable time interval. In addition, the coagulant composition must be capable of being mixed into a foamed latex without causing the foam to collapse.

I have discovered that a suitable delayed action coagulant composition for a latex and particularly for a foamed rubber latex comprises a water-soluble peroxide and the addition product of an alkali metal bisulfite and an aldehyde having the structure RCHO where R is either hydrogen or an alkyl radical.

An alkali metal bisulfite constitutes an effective instantaneous coagulant for latex but is not suitable for use as a delayed action coagulant. If, however, the alkali metal bisulfite is reacted with formaldehyde or an alkyl aldehyde, the addition product does not coagulate a rubber latex but may be mixed with the latex in an aqueous solution. Hydrogen peroxide or other suitable water-soluble peroxide may then be mixed into the latex and coagulation will be rapidly effected after a measurable induction period. In the case of the addition product of sodium bisulfite and acetaldehyde coagulation will be effected in 3–6

2 minutes after the addition of hydrogen peroxide to a rubber latex containing the addition product. The order of mixing may be varied as desired; the peroxide may be added to the latex before the bisulfite addition product or they may be added simultaneously.

Higher aldehydes behave in much the same manner regardless of the size of the alkyl group although the induction period is generally decreased somewhat with the higher homologues, probably due to the greater instability of the addition product. Ketones, on the other hand, as well as aryl aldehydes are not suitable for use in practising this invention because the bisulfite addition product is compatible with the latex only in low concentrations and coagulation is almost instantaneous upon addition of the peroxide so that the peroxide cannot be mixed with the latex without effecting immediate coagulation.

Thus, any addition product of an alkali metal bisulfite such as sodium or potassium bisulfite with an alkyl aldehyde such as acetaldehyde is suitable in practising this invention. The lower alkyl aldehydes are particularly suitable, that is, those having less than 6 carbon atoms in the alkyl radical since the bisulfite addition products of such lower aldehydes are compatible with latex foam in higher concentration than are those of the higher aldehydes. It is desirable to therefore use such lower alkyl aldehyde addition products to minimize dilution of the latex dispersion.

The coagulant composition described herein may be used to coagulate any rubber latex whether a natural or synthetic rubber latex or may be used to coagulate other latices containing polymeric organic compounds, as for example vinyl resin latices etc. The latex is preferably stabilized against salt flocculation by the addition of a suitable protective colloid such as methyl cellulose, gelatin or similar stabilizing agent, and may also contain the commonly employed compounding ingredients for latex such as fillers, reinforcing pigments, vulcanization agents and accelerators therefor, emulsifying agents, etc.

The bisulfite addition product is preferably added to the latex as a 20% aqueous solution in an amount such that the weight of the solid addition product is equal to from 0.1% to 15% of the weight of the dry rubber content of the latex to be coagulated. The amount of addition product used may be greater or less than this amount, however, depending upon the pH of the latex dispersion and the particular latex composition to be coagulated.

The hydrogen peroxide is preferably added as a 30% aqueous solution in an amount such that the weight of the peroxide is approximately equal to the weight of the bisulfite addition product, although weights of peroxide as low as 25% of the weight of the addition compound or lower may be used or an excess of the peroxide up to 2-3 times the weight of addition compound or higher may be used. It is preferable to use hydrogen peroxide because of its water-solubility and stability in aqueous solution although any water-soluble peroxide may be used as, for example, sodium peroxide, potassium peroxide or strontium peroxide.

The use of a coagulant composition embodying this invention is best illustrated by a few typical examples which are included merely for purposes of illustration and are not intended to limit the scope of this invention.

*Example I*

50 gm. Hevea latex (60% T. S.)
5 ml. 5% methyl cellulose solution
2 ml. zinc oxide dispersion (50%)
2 ml. 20% acetaldehyde-sodium bisulfite solution
2 ml. 30% hydrogen peroxide solution The above solutions and dispersions are in aqueous media. The latex methyl cellulose and zinc oxide are thoroughly mixed and the bisulfite addition compound is added thereto and thoroughly dispersed therein. The hydrogen peroxide is then stirred into the latex. Complete coagulation of the latex is effected in 5 minutes after the addition of the peroxide.

*Example II*

50 gm. GR-S latex (55:45 butadiene styrene copolymer—47% T. S.)
10 ml. 5% methyl cellulose solution
1 ml. 20% triethanol ammonium laurate solution
2 ml. 50% zinc oxide dispersion
3 ml. 20% formaldehyde-sodium bisulfite solution
2 ml. 30% hydrogen peroxide solution The components are mixed as in Example I and coagulation is complete in 9 minutes after addition of the peroxide solution.

Similar results are obtained using the potassium bisulfite etc. addition products or using such alkyl aldehydes as butyraldehyde or other higher homologues. Similar results are also obtained using other latex compositions and other water-soluble peroxides.

The invention has been described in detail with reference to a few preferred coagulant compositions embodying this invention, but it will be understood that variations and modifications may be effected within the spirit and scope of the invention as defined in the appended claims.

I claim:

1. A delayed action coagulant for an acid-coagulable aqueous dispersion of a rubber material which comprises hydrogen peroxide and the addition product of an alkyl aldehyde and an alkali metal bisulfite in which said aldehyde contains less than six carbon atoms in the alkyl group, the weight of said peroxide being from one-fourth to three times the weight of said addition product.

2. A delayed action coagulant for an acid-coagulable rubber latex which comprises hydrogen peroxide and the addition product of an alkyl aldehyde and sodium bisulfite in which said aldehyde contains less than six carbon atoms in the alkyl group, the weight of said peroxide being from one-fourth to three times the weight of said addition product.

3. A delayed action coagulant for an acid-coagulable rubber latex which comprises hydrogen peroxide and the addition product of acetaldehyde and sodium bisulfite, the weight of said peroxide being from one-fourth to three times the weight of said addition product.

4. A delayed action coagulant for an acid-coagulable rubber latex which comprises hydrogen peroxide and the addition product of formaldehyde and sodium bisulfite, the weight of said peroxide being from one-fourth to three times the weight of said addition product.

5. The method of coagulating an acid-coagulable aqueous dispersion of rubber material which comprises dispersing in said dispersion a delayed action coagulant composition comprising hydrogen peroxide and the addition product of an alkyl aldehyde and an alkali metal bisulfite in which said aldehyde contains less than six carbon atoms in the alkyl group, the weight of said addition product being from 0.1 to 15% by weight of said rubber material and the weight of said peroxide being from one-fourth to three times the weight of said addition product.

6. The method of coagulating an acid-coagulable rubber latex which comprises dispersing in said latex a delayed action coagulant composition comprising hydrogen peroxide and the addition product of an alkyl aldehyde and sodium bisulfite in which said aldehyde contains less than six carbon atoms in the alkyl group, the weight of said addition product being from 0.1 to 15% by weight of said rubber and the weight of said peroxide being from one-fourth to three times the weight of said addition product.

7. The method of coagulating an acid-coagulable rubber latex which comprises dispersing in said latex a delayed action coagulant composition comprising hydrogen peroxide and the addition product of acetaldehyde and sodium bisulfite, the weight of said addition product being from 0.1 to 15% by weight of said rubber and the weight of said peroxide being from one-fourth to three times the weight of said addition product.

8. The method of coagulating an acid-coagulable latex which comprises dispersing in said latex a delayed action coagulant composition comprising hydrogen peroxide and the addition product of formaldehyde and sodium bisulfite, the weight of said addition product being from 0.1 to 15% by weight of said rubber and the weight of said peroxide being from one-fourth to three times the weight of said addition product.

9. In combination with an acid-coagulable rubber latex, hydrogen peroxide and the addition product of an alkali metal bisulfite and an alkyl aldehyde in which said aldehyde contains less than six carbon atoms in the alkyl group, the weight of said addition product being from 0.1 to 15% by weight of said rubber and the weight of said peroxide being from one-fourth to three times the weight of said addition product.

10. In combination with an acid-coagulable aqueous dispersion of rubber material, hydrogen peroxide and the addition product of acetaldehyde and sodium bisulfite, the weight of said addition product being from 0.1 to 15% by weight of said rubber and the weight of said peroxide being from one-fourth to three times the weight of said addition product.

11. In combination with an acid-coagulable aqueous dispersion of rubber material, hydrogen peroxide and the addition product of formaldehyde and sodium bisulfite, the weight of said addition product being from 0.1 to 15% by weight of said rubber and the weight of said peroxide being from one-fourth to three times the weight of said addition product.

12. The composition of claim 1 in which the weight of said peroxide is substantially equal to the weight of said addition product.

13. The composition of claim 2 in which the weight of said peroxide is substantially equal to the weight of said addition product.

14. The composition of claim 3 in which the weight of said peroxide is substantially equal to the weight of said addition product.

15. The composition of claim 4 in which the weight of said peroxide is substantially equal to the weight of said addition product.

16. The method of claim 5 in which the weight of said peroxide is substantially equal to the weight of said addition product.

17. The method of claim 6 in which the weight of said peroxide is substantially equal to the weight of said addition product.

18. The method of claim 7 in which the weight of said peroxide is substantially equal to the weight of said addition product.

19. The method of claim 8 in which the weight of said peroxide is substantially equal to the weight of said addition product.

20. The method of coagulating Hevea latex which comprises dispersing in said latex a delayed action coagulant composition comprising hydrogen peroxide and the addition product of an alkyl aldehyde and an alkali metal bisulfite in which said aldehyde contains less than six carbon atoms in the alkyl group, the weight of said addition product being from 0.1 to 15% by weight of the rubber in said latex, and the weight of said peroxide being from one-fourth to three times the weight of said addition product.

21. In combination with Hevea latex, hydrogen peroxide and the addition product of an alkali metal bisulfite and an alkyl aldehyde in which said aldehyde contains less than six carbon atoms in the alkyl group, the weight of said addition product being from 0.1 to 15% by weight of the rubber in said latex, and the weight of peroxide being from one-fourth to three times the weight of said addition product.

JEROME C. WESTFAHL.

REFERENCES CITED

The following references are of record in the file of this patent:

UNITED STATES PATENTS

| Number | Name | Date |
| --- | --- | --- |
| 1,870,788 | Twiss et al. | Aug. 9, 1932 |
| 1,981,184 | McGavack | Nov. 20, 1934 |
| 2,138,081 | Wolf | Nov. 29, 1938 |
| 2,206,448 | Busse et al. | July 2, 1940 |
| 2,350,294 | Stewart | May 30, 1944 |

FOREIGN PATENTS

| Number | Country | Date |
| --- | --- | --- |
| 23,723 | Great Britain | 1911 |